United States Patent [19]

Adams

[11] 4,139,063
[45] Feb. 13, 1979

[54] CONTROL FOR THE HYDRAULIC POWER LIFT OF A TRACTOR

[75] Inventor: Heribert Adams, Hoffnungstahl, Fed. Rep. of Germany

[73] Assignee: Klöckner-Humboldt-Deutz Aktiengesellschaft, Cologne, Fed. Rep. of Germany

[21] Appl. No.: 799,273

[22] Filed: May 23, 1977

[30] Foreign Application Priority Data

May 22, 1976 [DE] Fed. Rep. of Germany ....... 2623097

[51] Int. Cl.² .......................................... A01B 63/112
[52] U.S. Cl. ...................................................... 172/9
[58] Field of Search ...................... 172/7, 9, 10, 11, 12; 37/DIG. 1; 214/762, 763; 280/405 B

[56] References Cited

U.S. PATENT DOCUMENTS

| 2,722,873 | 11/1955 | Garmager | 172/9 |
| 2,964,113 | 12/1960 | Presnell et al. | 172/9 |
| 3,331,447 | 7/1967 | Simak | 172/9 |

FOREIGN PATENT DOCUMENTS

| 1169182 | 4/1964 | Fed. Rep. of Germany | 172/9 |
| 1251568 | 10/1967 | Fed. Rep. of Germany | 172/9 |

Primary Examiner—Richard T. Stouffer
Attorney, Agent, or Firm—Walter Becker

[57] ABSTRACT

A control for the hydraulic power lift of a tractor, particularly one used in agriculture. The control includes a pre-control slide valve which is adjustable not only by the pick-up or indicator of the working resistance or the position of a working implement but also by a rated or desired value pick-up, by way of a control linkage, to the control positions "lift", "neutral", and "lower". A first spring which urges the pre-control slide valve toward the lifting position, engages the control linkage to transmit the values of the working resistance. The force of this spring is greater than the force of the spring which continuously urges the pre-control slide valve towards the lowering position. The pick-up or indicator for the working resistance of the working implement is linked to the control linkage, against the force of the first spring, by way of a rod having a slotted hole.

3 Claims, 1 Drawing Figure

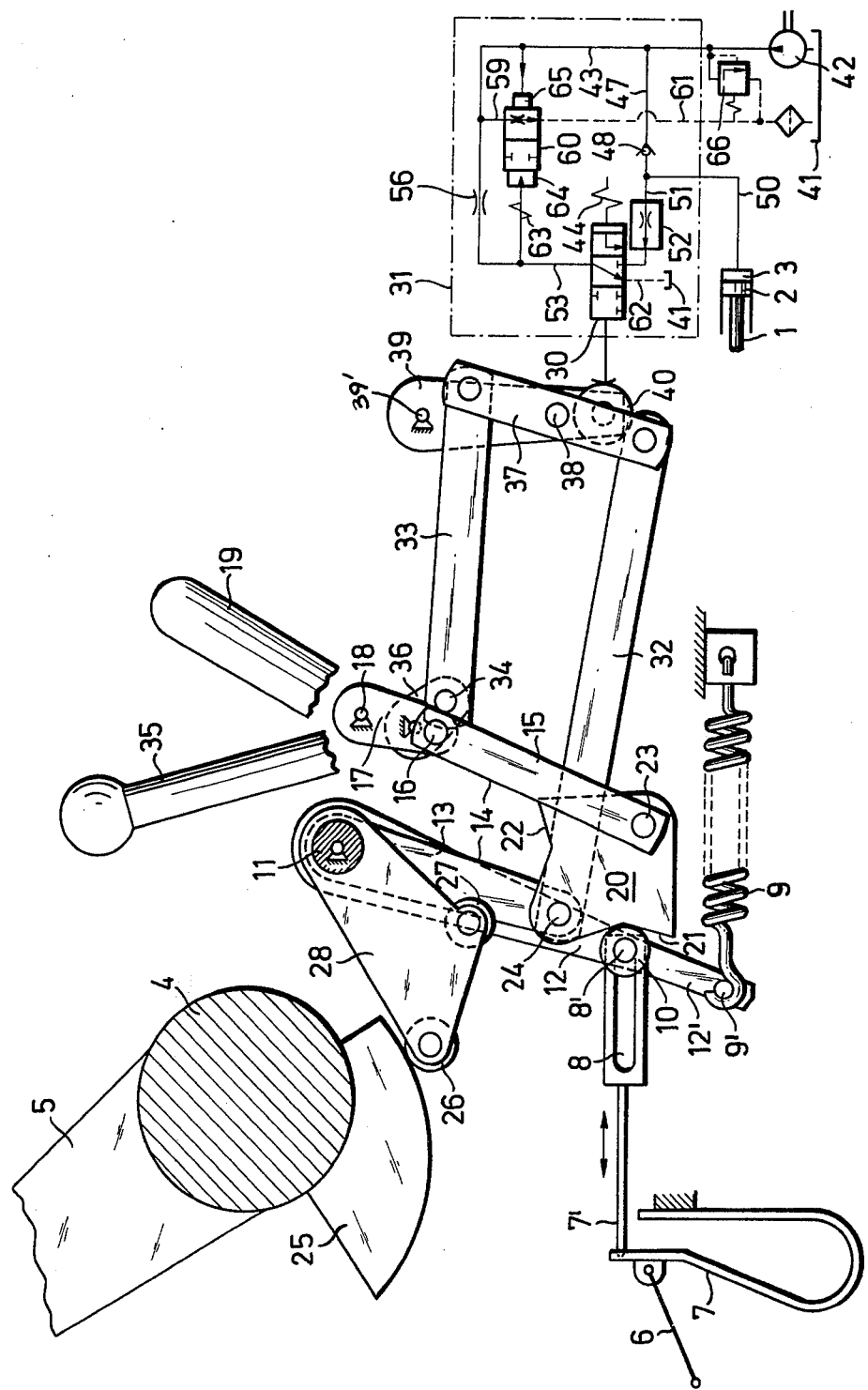

CONTROL FOR THE HYDRAULIC POWER LIFT OF A TRACTOR

The present invention relates to a control for the hydraulic power lift of a tractor which is usable in agriculture. The control has a pre-control slide valve which is adjustable, not only by the pick-up or indicator of the working resistance or the position of a working implement but also by a rated or desired value pick-up, by means of a control linkage, to the control positions "lift", "neutral" and "lower". The pre-control slide valve is continuously urged in the lowering direction by a spring.

With a control of the above mentioned type for hydraulic power lifts, the values which originate from the pick-up of the working resistance are usually transmitted to the pre-control slide valve of the control in the form of differently sized regulating strokes of a control linkage. The regulating strokes of the pre-control slide valve must in this connection be great enough that even the greatest possible values of the pick-up or indicator are freely transmitted over the control linkage to the pre-control slide valve; otherwise, deformations of the control linkage can occur. The necessary great regulating strokes of the pre-control slide valve, however, have the drawback that correspondingly large positioning components are required. These components usually taken up considerable space. A solution for using a precontrol slide valve having small regulating strokes is known for example from German Auslegeschrift No. 11 41 478, according to which an elastic element or link is inserted in the control linkage for transmitting the values of the working resistance. However, such an arrangement is expensive and prone to problems, especially when the elastic link is in the power flow of the control linkage.

It is an object of the present invention, while avoiding the described drawbacks, to improve a control of the above mentioned general type by the simplest possible means in such a way that when using a pre-control slide valve with very short regulating strokes, the deformation of an ordinary control linkage is positively avoided.

This object and other objects and advantages of the present invention will appear more clearly from the following specification in connection with the accompanying drawing which shows a specific embodiment of a control according to the present invention.

The control pursuant to the present invention is characterized primarily in that a first spring, which urges the pre-control slide valve in the lifting direction, engages the control linkage to transmit the values of the working resistance. The force of this spring is greater than the force of the spring which works against the pre-control slide valve.

The present invention is further characterized in that the pick-up or indicator for the working resistance of the working implement is attached to the control linkage, against the force of the first spring, by means of a rod having a slotted hole.

By means of these arrangements, only those control valves which to the regulating strokes, of the pre-control slide valve are transmitted by means of the control linkage, so that even with a pre-control slide valve having the smallest regulating strokes a deformation of the control linkage by overloading is precluded.

Pursuant to a further embodiment of the present invention, not only the pick-up or indicator for the values of the working resistance, but also an indicator or pick-up for the values of the position control of a working implement engage the control linkage, in which connection the indicator or pick-ups are connected with the pre-control slide valve by means of a switch-over device for selective adjustment of the desired control action of the working implement.

According to a preferred form of the invention, the transmitting element of the actual values from the switch-over device to the pre-control slide valve is designed as an arm of a four-part link, the second arm of which is pivotably connected to a link which is displaceable by a hand lever, the position of which determines the rated or desired value. In this connection, the coupling link of the two arms is in contact with the pre-control slide valve.

IN THE DRAWING

The drawing illustrates a control mechanism having features in accordance with the present invention for a hydraulic power lift tractor.

Referring now to the drawing in detail, the lift shaft 4 is adjustable in a suitable manner by means of the piston rod 1 of the power lift piston 2 of the lifting cylinder 3. The lift shaft 4 has a lifting arm 5 which, together with a second, not shown, lifting arm, is coupled to a likewise not shown connecting device by means of which a mounted or attached working implement is raised or lowered by the power lift. The upper control lever 6 of the connecting device is, on the tractor side, pivoted on one arm of a U-shaped measuring spring 7, the other arm of which engages a stationary part at the back of the tractor. The U-shaped measuring spring 7 serves as a pick-up for the actual values of the working resistance of a working implement. At the free arm of the measuring spring 7, one end of a connecting rod 7' is linked on the side opposite the upper control lever 6. The other end of the connecting rod 7' movably engages a pin 8' by means of, and in the longitudinal direction of, a slotted hole 8. The pin 8' rotatably supports a roller 10 and is fixedly mounted on an arm 12 which is pivotally supported about a stationary shaft 11. A spring 9, with one end on a pin 9', engages the free end 12' of the arm 12. The other end of the spring 9 is fixedly attached to the power lift housing. On the stationary shaft 11, next to the arm 12, is mounted the arm 13 of a four-part link 14, one arm 15 of which is attached by means of a pin 16 to a crank 17 which, by means of a shaft 18, is pivotable by a system selector lever 19. The arm 13 is connected to the arm 15 by means of a coupling link 20, which on both sides has a respective stop 21 or 22. The connection of the arm 15 with the coupling link 20 is accomplished by means of a pivot pin 23, while a pivot pin 24 serves as the connection of the arm 13 with the coupling link 20.

As shown in the drawing, the position of the coupling link 20 is altered by means of the system selector lever 19 by displacing the crank 17 and the arm 15 in such a way that the stop 21 rests against the roller 10 of the arm 12. In so doing, the actual values of the working resistance, which values are ascertained by the measuring spring 7, are conducted by the connecting rod 7' over the roller 10 and stop 21 to the two arms 13 and 15 of the four-part link 14 which is alterable by the system selector lever 19. The arrangement is such that during operation of a working implement, the control pulses which in the drawing go toward the left are transmitted by the connecting rod 7' and the slotted hole 8, which engages the pin 8', directly to the roller 10, while the force originating from the spring 9 is provided for conducting the control pulses which go in the opposite direction toward the right over the coupling link 20 into the four-part link 14.

If in this connection the control pulses which go toward the left exceed the structurally provided maximum permissible regulating stroke, the roller 10 is lifted off from its stop 21 on the coupling link 20 against the force of the spring 9. If on the other hand, the control pulses which go toward the right exceed the maximum regulating stroke, a correspondingly great free-wheeling is realized pursuant to the arrangement of the slotted hole 8 relative to the pin 8'. By means of these arrangements, the danger of overloading, particularly of the linkage, when exceeding permissible regulating strokes is safely avoided.

If the control of a working implement is to proceed based on its position, the coupling link 20 is pivoted counterclockwise about the pivot pin 24 by the system selector lever 19 until the coupling link 20, with its stop 22, engages the roller 27 of an arm 28. A cam 25, which is nonrotatably connected to the lift shaft 4, serves to pick up the actual value of the position. The cam 25 acts upon the stop 22 of the coupling link 20 by means of the arm 28, which, at the contact areas, is provided with rollers 26 and 27. The arm 28 is arranged on the stationary shaft 11 next to the arm 13 in such a way that the arm 13 is between the arm 12 and the arm 28.

By the coupling link 20 of the arms 13 and 15, the respective introduced actual values of the positions or tractional resistance are transmitted to an arm 32 which is pivotally connected to the arm 13 by means of the pivot pin 24. Another arm 33, by means of a pin 34, is connected to a crank 36 which is pivotable by the desired or rated value adjuster 35. The two arms 32 and 33 are pivotably connected with one another by means of a coupling link 37 which in turn, by means of a pin 38, is linked to an arm 39 which is pivotally supported by a pin 39' which is stationarily mounted on the power lift housing. The transfer of the rated or actual values to the pre-control slide valves 30 is effected by the arm 39 over a roller 40 attached thereto.

If by means of the hand lever 35, which serves as the desired or rated value adjuster, and by means of the pivoting of which, over the arm 33, a rated or desired value is fed-in for the controlling action which is actuated by means of the system selector lever 19, there follows a displacement of the precontrol slide valve 30 of the hydraulic control mechanism 31. The slide valve 30 is loaded by a spring 44 which is naturally weaker than the spring 9 which engages the arm 12. In the control mechanism 31, the suction side of a pressure medium pump 42 is connected with a pressure medium supply container 41, and the pressure side of the pump 42 is connected with lines 43, 47 and 59. The line 47 passes through a check valve 48 and not only through a line 50 to the lifting cylinder 3 of the power lift, but also through a line 51 to a volume control valve 52, to which is connected the pre-control slide valve 30. From the pre-control slide valve 30, a line 53 extends, through the intermediary of a throttle or pressure regulating valve 56, not only to the line 43 but also to the line 59 which branches off therefrom and is connected to the main control slide valve 60. The main control slide valve 60, which is urged in the closing direction by a spring 63, and the pre-control slide valve 30 are connected with the supply container 41 by means of a return line 61 or 62 respectively. The main control slide valve 60 is connected with the line 53 by a working chamber 64 which is arranged on its left side, and is connected with the line 43 by a working chamber 65 which is arranged on its right side. For securing the system, the pressure line 43 is connected to a relief valve 66.

In the illustrated neutral position, the pre-control slide valve 30 is in mid position and the main control slide valve 60 is in the left end position. If a lifting pulse is conveyed to the pre-control slide valve 30 by one of the actual value pick-ups 7 or 25, which are actuated by means of the system selector lever 19, there is effected a displacement of the pre-control slide valve 30 toward the right. This cuts off the line 53 from the supply container 41. Consequently, a uniform pressure is built up in the lines 43 and 53 as well as in the working chambers 64 and 65 of the main control slide valve 60. The spring 63 displaces the main control slide valve 60 out of the illustrated position into the right end position. This cuts off the lines 43 and 59 from the supply container 41. A pressure is built up in lines 43 and 59, which pressure, through the lines 47 and 50, acts upon the piston 2 of the lifting cylinder 3 so that the piston rod 1, by means of the lift shaft 4, turns the lifting arm 5 in a clockwise direction, effecting a lifting of the working implement.

If the pre-control slide valve 30, when it is in the right end position or in a mid position, receives a lowering pulse from one of the actual value indicators 7 or 25 or from the rated or desired value adjustor 35, pre-control slide valve 30 is displaced into the left end position. As a result thereof, by means of the pre-control slide valve 30, the lines 51 and 53, through the line 62, are connected with the supply container 41, resulting in the pressure medium flowing out of the cylinder 3 through the volume control valve 52. This effects, by means of the return of the piston 2, a counterclockwise turning of the lift shaft 4 as well as the lifting arm 5, so that the working implement is lowered. By the opening of the line 53, the pressure in the working chamber 64 of the main control slide valve 60 drops, so that eventually a dominant pressure in the working chamber 65 again moves the main control slide valve 60 against the force of the spring 63 into the left end position. In this end position, the pressure medium conveyed from the pump 42 through the lines 43 and 59 to the main control slide valve 60 flows back at low pressure through the line 61 to the supply container 41.

It is, of course, to be understood that the present invention is by no means limited to the specific showing in the drawing, but also encompasses any modifications within the scope of the appended claims.

What I claim is:

1. A control for the hydraulic power lift of a tractor and a working implement associated therewith, particularly of a tractor used in agriculture, which comprises in combination: a mechanical control mechanism associated with said tractor and including first pick-up means for indicating the working resistance of said working implement and having a slotted hole portion therewith, second pick-up means for indicating the position of said working implement, third pick-up means for indicating the desired value of the position of said working implement, first spring means, and linkage means which includes rod means connected to the slotted hole portion of said first pick-up means for working resistance; and a hydraulic control system associated with said tractor and including a pre-control slide valve operatively connected to said linkage means and movable into "lift", "neutral", and "lower" positions for respectively causing said working implement to move into a lifted, neutral, and lowered position, said pre-control slide valve including a second spring means which continuously urges said pre-control slide valve into said lower position, and which, while being weaker than said first spring means, acts counter to the latter, said hydraulic control system also including piston means operatively connected to said precontrol slide valve and said working implement for translating the respective position of said pre-control slide valve to said working implement.

2. A control in combination according to claim 1, in which said first pick-up means and said second pick-up means are operatively connected to said mechanical control mechanism, and shift-over control means operable for selectively establishing connection of either one of said first and second pick-up means with said pre-control slide valve to set the desired control for the working implement.

3. A control for the hydraulic power lift of a tractor and a working implement associated therewith, particularly of a tractor used in agriculture, which comprises in combination: a mechanical control mechanism associated with said tractor and including first pick-up means for indicating the working resistance of said working implement and having a slotted hole portion therewith, second pick-up means for indicating the position of said working implement, third pick-up means for indicating the desired value of the position of said working implement, first spring means, and linkage means which includes rod means connected to the slotted hole portion of said first pick-up means for working resistance; and a hydraulic control system associated with said tractor and including a pre-control slide valve operatively connected to said linkage means and movable into "lift", "neutral", and "lower" positions for respectively causing said working implement to move into a lifted, neutral, and lowered position, said pre-control slide valve including a second spring means which continuously urges said pre-control slide valve into said lower position, and which, while being weaker than said first spring means, acts counter to the latter, said hydraulic control system also including piston means operatively connected to said pre-control slide valve and said working implement for translating the respective position of said pre-control slide valve to said working implement, said first pick-up means for said second pick-up means being operatively connected to said mechanical control mechanism, and shiftover control means operable for selectively establishing connection of either one of said first and second pick-up means with said pre-control slide valve to set the desired control for the working implement, said mechanical control mechanism including a four-bar chain having a first arm for transmitting actual values of the working resistance of the working implement from said shift-over control means to said pre-control slide valve, said mechanical control mechanism also including a manually operable lever for determining the desired value of the working resistance of the working implement, said mechanical control mechanism also including a link displaceable by said manually operable lever, and said four-bar chain including a second arm pivotally supported by said link, coupling means being provided with couple said first and second arms together and are positively connected to said pre-control slide valve.

* * * * *